Dec. 22, 1959  R. H. GOODALE  2,918,296
ONE-WHEELED FOLDABLE CARRIER WITH SPRING
PIN STRUT CONNECTION
Filed Sept. 3, 1957  2 Sheets-Sheet 2
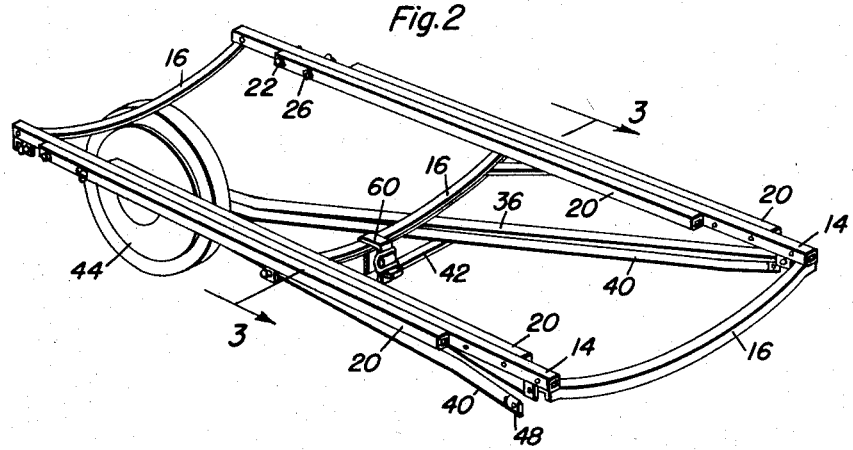
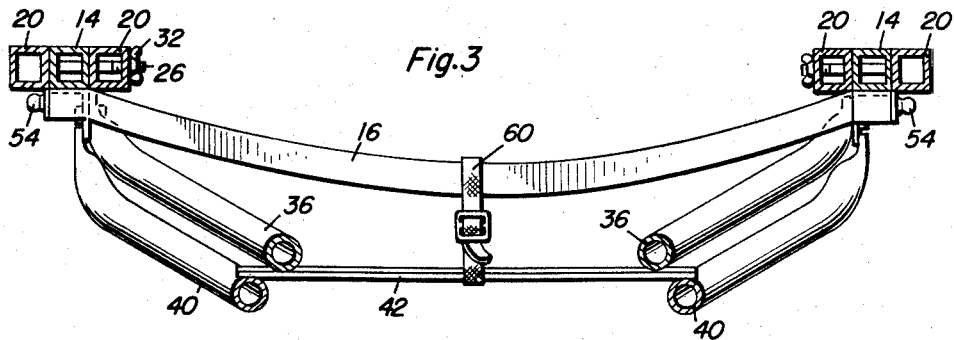
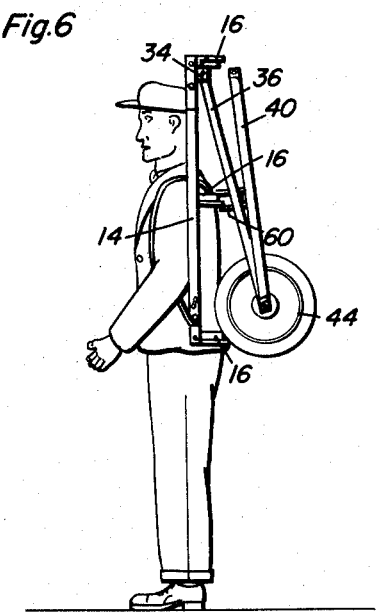
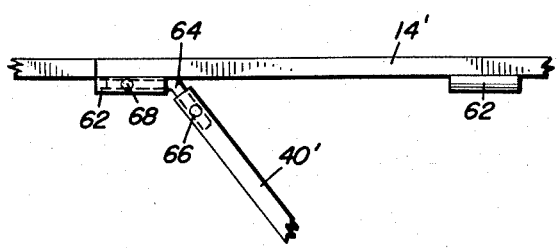
Ralph H. Goodale
INVENTOR.

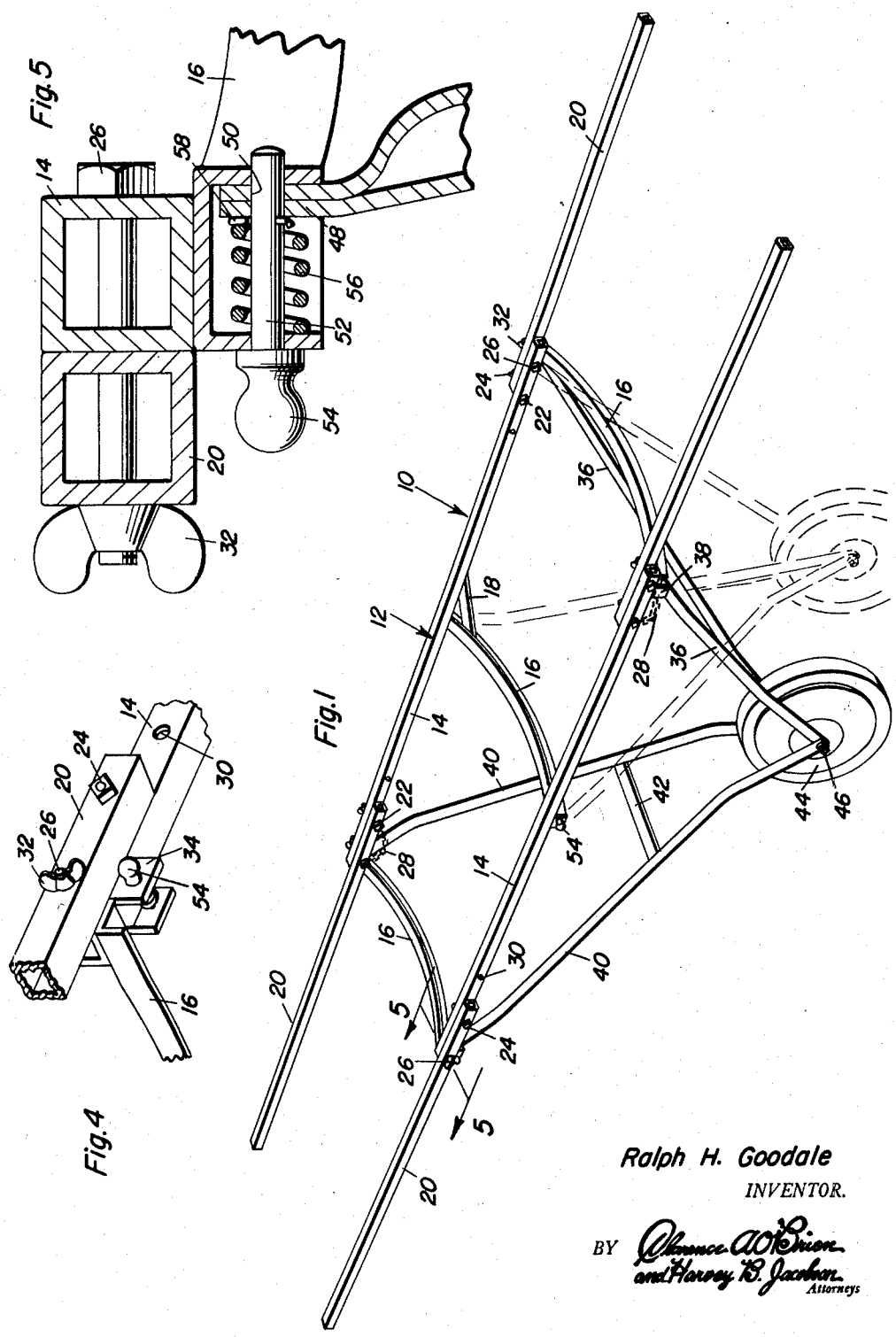

United States Patent Office 2,918,296
Patented Dec. 22, 1959

2,918,296

ONE-WHEELED FOLDABLE CARRIER WITH SPRING PIN STRUT CONNECTION

Ralph H. Goodale, Pomona, Calif.

Application September 3, 1957, Serial No. 681,652

1 Claim. (Cl. 280—41)

The present invention generally relates to a carrier of the type specifically constructed for carrying loads and this application is a continuation-in-part of my co-pending application, Serial No. 546,861, filed November 15, 1955, for Wheeled Foldable Carrier, now Patent No. 2,811,367, granted October 29, 1957.

An object of the present invention is to provide a wheeled foldable carrier adapted for use in various orientations but primarily provided for carrying loads over uneven terrain and incorporates longitudinally extending forward and rear handles for straddling or receiving therebetween persons using the carrier.

Another object of the present invention is to provide a foldable carrier in which the supporting wheel means is mounted at the lower end of a pair of downwardly converging braces with the upper end of one of the braces having a detachable connection to the supporting frame for longitudinal adjustment thereon for varying the effective height of the frame and for orientating the wheel longitudinally of the frame for varying the balance characteristics of the carrier.

Another important feature of the present invention is to provide a foldable carrier in accordance with the preceding objects in which the handles and supporting struts or braces for the wheels are foldable to a position alongside of the frame whereby the entire apparatus may be easily transported by a single person.

Other objects of the present invention are to provide a carrier which is extremely rigid and strong in construction, relatively lightweight, easy to fold, easy to carry, its adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the carrier of the present invention with the supporting wheel being shown in two positions;

Figure 2 is a perspective view of the carrier in folded condition;

Figure 3 is a transverse, sectional view taken substantially upon a plane passing along section line 3—3 of Figure 2 illustrating the relationship of the elements of the carrier when in folded condition;

Figure 4 is a fragmental perspective view showing the manner in which the handle is attached to the frame;

Figure 5 is a detail sectional view taken substantially upon a plane passing along section line 5—5 of Figure 1 illustrating the manner in which the handle is attached to the frame and the manner in which the strut for the wheel is attached to the frame;

Figure 6 is a side elevational view illustrating the manner in which the carrier of the present invention may be easily transported; and Figure 7 is a partial side elevational view illustrating a modified form of attaching means between the struts and the frame.

Referring now specifically to the drawings, the numeral 10 generally designates the carrier of the present invention which includes a substantially horizontally disposed frame generally designated by the numeral 12 which includes a pair of longitudinally elongated side rails 14 which are disposed in spaced parallel relation and are interconnected by a plurality of spaced parallel transverse cross members 16 which are downwardly bowed for providing a concave surface to the frame 12. The side rails 14 are of hollow construction of polygonal cross section while the cross members 16 may also be of this construction and may be rigidly connected to the side rails 14 in any suitable manner and also reinforced by gusset plates 18 if desired.

At each end of each side rail 14 is a longitudinally extending handle 20 constructed of the same material as the side rails 14 and forming an extension thereof with the inner ends of the handles 20 being disposed alongside the outer ends of the side rails 14. A pivot bolt 22 extends through the end of the side rails 14 and through the handle 20 in spaced relation to the end thereof and is provided on its outer end with a nut 24 for providing a pivot axis for the handle 20 for movement from a position extending from the outer end of the side rail 14 to a position alongside of the side rail 14. For maintaining the handles 20 in their two positions, there is provided a removable fastening bolt 26 having a flexible chain 28 connected thereto to prevent loss thereof when the fastening bolt 26 is removed and the handle 20 pivoted inwardly to a position alongside of the side rail 14 after which the fastening bolt 26 may be inserted through an aperture 30 provided in the side rail 14 for securing the handle 20 in position alongside the side rail 14. As shown in Figure 5, the fastening bolt 26 is provided with a wing nut 32 for ease of removal thereof. With the previously described structure, there is provided means for rigidly securing the handle 20 in extended position or in retracted position thus enabling the handles at each end of the frame 12 to straddle a person whereby two people may propel the carrier of the present invention or either or both of the pairs of handles may be folded up for permitting operation by a single person or for permitting the device to be strapped to a single person for transportation of the carrier.

Figure 4 illustrates that the transverse cross members 16 may be of angle iron construction and at each end of each cross member 16 is provided an inverted U-shaped bracket 34 secured to the undersurface of the side rail 14 immediately inwardly of the transverse member 16. Pivotally secured to one end pair of brackets 34 is a pair of depending and converging braces 36 which are secured to the brackets 34 by pivot pins 38. Detachably and pivotally secured to one of the other pairs of brackets 34 is a pair of depending braces 40 having a transverse brace member 42 generally intermediate the ends thereof. The braces 36 and 40 straddle and receive a single wheel 44 which is mounted on a suitable transverse axle 46 which also secures the lower ends of the braces 36 and 40 in position thus providing a triangular supporting mechanism for the frame 12 with the wheel 14 being at the bottom or apex of the converging pairs of braces 38 and 40.

The braces 36 and 40 are preferably of hollow construction with each being flattened as indicated by numeral 48 at the upper end and provided with an aperture 50. Extending through the depending legs of the brackets 34 and also through the aperture 50 is a slidable peg or pin 52 having a knob-like handle 54 thereon. The pin 52 is urged into registry with the opening 50 by a compression coil spring 56 abutting the outer leg of the bracket 34 and an abutment 58 on the pin 52 for urging the pin 52 inwardly into engagement with the aperture 50 thus detachably securing the upper ends of the braces 40 to one of the spaced pair of brackets 34. By positioning the upper ends of the braces 40 in the bracket 34 at the outermost cross member 16, one elevation of the frame 12 is provided and the device is balanced in a particular manner. By connecting the upper ends of the brace members 40 to the pair of brackets 34 adjacent the center cross member 16, the height of the frame 12 may be elevated and another balance characteristic obtained. By disconnecting the upper ends of the braces 40 and swinging the braces 36 upwardly to underlie the frame and rails and then swinging the braces 40 around to underlie the braces 36 substantially as illustrated in Figures 2 and 6, a tie strap 60 may be provided between the central cross member 16 and the transverse brace member 42 and suitable shoulder straps may be provided for carrying the carrier in the manner shown in Figure 5. The specific orientation of the shoulder straps have not been shown but they may be conveniently attached to the side rails 14 in any suitable manner.

Figure 7 illustrates a modified form of the present invention in which the frame rails 14' are each provided with a pair of longitudinally extending, aligned and spaced sleeves 62. The upper ends of the hollow braces 40' are open and receive an obtuse angled connector rod 64 which is held in the upper end of the braces 40' by a fastening member 66 and held in the sleeve 62 by a removable fastening member 68 whereby the upper end of the braces 40' may effectively be longitudinally adjusted in relation to the frame rail 14' for accomplishing the same purpose as in the device shown in Figure 1.

The spring urged pin construction for holding the upper ends of the braces in position provides a rigid and positive connection but yet provides one which is easily released for permitting easy folding of the carrier or for permitting adjustment of the frame or wheel in relation to the frame. The braces or struts are also of lightweight construction thus providing a carrier which is easily maneuvered by one or two persons and which may be easily converted from a carrier to a folding condition for ease of carrying over certain types of terrain.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A foldable and portable carrier comprising an elongated generally rectangular frame, a first pair of depending braces pivotally attached to said frame, a second pair of depending braces detachably connected to said frame, wheel means supported from the lower end of said braces with the braces being pivotal in relation to each other for folding to a position underlying the frame and superposed in relation to each other, a transverse member interconnecting the second pair of braces and retaining the braces in rigid relation, said frame having a first and second pair of longitudinally spaced and aligned brackets, said first pair of brackets pivotally mounting the first pair of braces to the frame, each of said second pair of brackets defining a downwardly opening socket for receiving the upper end of each of the second pair of braces, and a retractible pin extending through the socket in each bracket of the second pair and the upper end of each of the second braces for releasably connecting the second braces to the frame, said frame including a pair of longitudinal straight rails receiving said brackets and a plurality of transverse members of a curved construction interconnecting the side rails with said transverse member interconnecting the braces directly underlying one of the frame transverse members when in folded condition for receiving a retaining strap for retaining the carrier in folded condition, an elongated handle pivotally connected to each end of each rail for straddling a person propelling the carrier, said handles having a length greater than one-half of the length of the frame rails, the handles on one end being disposed on one side of the longitudinal rails and the handles on the other being disposed on the other side of the longitudinal rails thereby enabling the handles to fold inwardly to position alongside of the rails when folded, and a removable fastener bolt for releasably retaining the handles in longitudinally extending relation to said rails.

References Cited in the file of this patent

UNITED STATES PATENTS

| 547,288 | Remington | Oct. 1, 1895 |
|---|---|---|
| 2,416,492 | Neeley | Feb. 25, 1947 |
| 2,546,604 | Lafky | Mar. 27, 1951 |
| 2,725,240 | Johnson | Nov. 29, 1955 |
| 2,811,367 | Goodale | Oct. 29, 1957 |

FOREIGN PATENTS

| 813,507 | France | Feb. 22, 1937 |
|---|---|---|
| 154,030 | Germany | Sept. 23, 1904 |
| 534,162 | Great Britain | Feb. 28, 1941 |